Patented Oct. 22, 1940

2,218,750

UNITED STATES PATENT OFFICE 2,218,750

PROCESS FOR MAKING FLUORESCENT SCREEN MATERIAL FOR CATHODE RAY TUBES

Heinrich Hinderer, Berlin-Zehlendorf, Germany, assignor to the firm of Fernseh Aktien-Gesellschaft, Zehlendorf, near Berlin, Germany No Drawing. Application May 15, 1937, Serial No. 142,914. In Germany May 18, 1936

4 Claims. (Cl. 250—81)

This invention relates to the production of fluorescent screen material for cathode ray tubes, and particularly relates to a new process of making phosphorescent sulphides.

Phosphorescent sulphides have so far been made according to two processes. First, by extracting the sulphide from sulphate solutions with hydrogen sulphide or ammonium sulphide and subsequent baking with addition of heavy metals; second, by reduction of sulphates or oxides provided with additions of heavy metals in a nitrogen stream charged with carbon disulphide.

The disadvantage of the first process lies in the fact that the formation of the sulphide and the activation of the sulphide with additions of heavy metals occur in two separate processes at different temperature. The sulphides proper are produced at a low temperature, for instance, approximately 150 degrees centigrade maximum. In the subsequent baking process it cannot be avoided that the sulphides partly decompose again, that the metal evaporates or oxides are formed especially so as the baking process requires high temperatures and long duration at a later activation of the sulphides, where the heavy metal must be conveyed into the finished sulphide lattice. As a consequence thereof, it has been proven that it is entirely impossible to obtain pure and reproducible end products with such a process. With the most exact reproduction of the process it is always a matter of coincidence if the qualities of the obtained phosphorescent sulphides are the same or not. This is also true for the second known process, even if the formation of sulphide and the activation occur in one single process. The impossibility to reproduce the end products is in this case caused by uncontrollable organic impurities of the carbon disulphide, which are practically unavoidable. Furthermore, the carbon proper is already such an impurity.

If the mentioned disadvantages, namely the lack of purity and the reproducibility of the end products, let these processes for production of phosphorescent sulphides for cathode ray tubes not seem suitable, they are of especial importance in the production of screens in which, as for instance, in the so-called projection tubes with small screens of great brilliancy, the luminescent screen material is subject to high requirements and, therefore, even slight differences of its qualities will be strongly noticeable.

According to the invention the production of a pure and at all times reproducible phosphorescent sulphide for luminescent screens of cathode ray tubes is made possible by a process in which hydroxides or oxides are mixed with sulphur and are heated in an atmosphere of hydrogen or hydrogen sulphide to such a high temperature that the conversion into sulphides occurs. The application of this process is especially preferable for the production of zinc cadmium sulphides. A complete conversion of the hydroxides or oxides into the sulphides is readily obtained so that the end products may possess the desired or required purity without difficulty. It is also possible to let the reaction happen in another gas preventing oxidation, in place of a hydrogen or a hydrogen sulphide atmosphere. However, it has been found that the conversion of the hydroxides or oxides into the sulphides is strongly favored by hydrogen or hydrogen sulphide. The addition of the heavy metals as an activator to the sulphides may be made after the conversion and both may be baked again together. It is, however, preferable to make the addition to the hydroxides or oxides before conversion. When doing so the process for production of phosphorescent sulphides according to the invention requires a time of approximately three minutes, which corresponds to one-tenth of the time which was necessary in the processes so far known. The duration of the baking process and the baking temperature may, however, be varied according to the conditions, for instance, the pressure under which the reaction occurs. As in the known processes, additional flux may also be applied in this case where it has the effect of a better conversion of the mixture, contrary to the known processes where it serves the purpose of influencing the crystal shape.

Two examples of the process according to the invention follow:

*1st example.*—10 grams of zinc hydroxide, 4 grams of cadmium hydroxide, 7 grams of purest sulphur and 0.00006 gram of silver nitrate are taken in powder condition and are thoroughly mixed and heated to a temperature above 400 degrees centigrade for three minutes in a stream of hydrogen or hydrogen sulphide. In order to increase the speed of the reaction the pressure may be increased. The color of luminescence of the obtained phosphorescent sulphide lies between white and yellow.

*2nd example.*—10 grams of zinc hydroxide, 5 grams of sulphur and 0.00007 gram of copper nitrate are taken in powder condition and are mixed as above and heated in a revolving furnace in an atmosphere of hydrogen or hydrogen sulphide. The phosphorescent sulphide not containing cadmium has a color of luminescence which is green.

The phosphorescent sulphides produced by the processes according to the invention are of fine crystal structure and may be used as luminescent screen material without further mechanical or chemical treatment.

I claim:

1. The process of manufacturing a luminescent compound which comprises mixing thoroughly together powdered zinc hydroxide, cadmium hydroxide, sulphur, and silver nitrate, and heating the mixture so formed for about three minutes at a temperature of the order of 400° C. in a non-oxidizing atmosphere.

2. The process of manufacturing a luminescent compound which comprises mixing thoroughly together powdered zinc hydroxide, cadmium hydroxide, sulphur, and silver nitrate, heating the mixture to above 400° C. for three minutes in a non-oxidizing atmosphere, and passing hydrogen over said mixture during such heating.

3. The process of manufacturing a luminescent compound which comprises mixing thoroughly together powdered zinc hydroxide, cadmium hydroxide, sulphur, and silver nitrate, and heating the mixture so formed in a stream of hydrogen sulphide for a length of time of the order of three minutes at a temperature of the order of 400° C.

4. The process of manufacturing a luminescent compound which comprises mixing thoroughly together powdered zinc hydroxide, cadmium hydroxide, sulphur, and silver nitrate, heating the mixture so formed for about three minutes at a temperature of the order of 400° C. in a non-oxidizing atmosphere, and controlling the pressure of the atmosphere in which said mixture is heated.

HEINRICH HINDERER.